(12) United States Patent
Trifol et al.

(10) Patent No.: US 11,745,220 B2
(45) Date of Patent: Sep. 5, 2023

(54) FILTER EXTRACTOR TOOL AND METHODS THEREOF

(71) Applicant: Schlumberger Technology Corporation, Sugar Land, TX (US)

(72) Inventors: Hugues Trifol, Clamart (FR); Matthieu Dezaphix, Clamart (FR); Josephine Mannent, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 680 days.

(21) Appl. No.: 16/664,483

(22) Filed: Oct. 25, 2019

(65) Prior Publication Data

US 2020/0130017 A1    Apr. 30, 2020

Related U.S. Application Data

(60) Provisional application No. 62/751,252, filed on Oct. 26, 2018.

(51) Int. Cl.
| | |
|---|---|
| *B07B 1/50* | (2006.01) |
| *B07B 1/18* | (2006.01) |
| *B07B 1/28* | (2006.01) |
| *E21B 37/00* | (2006.01) |
| *B01D 29/96* | (2006.01) |
| *B01D 46/42* | (2006.01) |

(52) U.S. Cl.
CPC ............... *B07B 1/50* (2013.01); *B01D 29/96* (2013.01); *B07B 1/18* (2013.01); *B07B 1/28* (2013.01); *E21B 37/00* (2013.01); *B01D 46/4227* (2013.01); *B01D 2201/24* (2013.01)

(58) Field of Classification Search
CPC .... B07B 1/50; B07B 1/18; B07B 1/28; B01D 29/96; B01D 46/4227; B01D 2201/24; B01D 29/35; E21B 37/00
USPC ....... 210/791, 159, 167.31, 171, 172.5, 232, 210/234, 238, 237, 248, 249, 250, 251, 210/252, 282, 455, 470
See application file for complete search history.

(56) References Cited

U.S. PATENT DOCUMENTS

| | | | |
|---|---|---|---|
| 2,326,484 A * | 8/1943 | Moreton ................ | B01D 29/39 210/138 |
| 2,870,934 A | 1/1959 | Hill | |
| 4,519,519 A | 5/1985 | Mueschke et al. | |
| 2019/0023589 A1 | 1/2019 | Norman et al. | |
| 2020/0132240 A1 | 4/2020 | Trifol et al. | |

\* cited by examiner

*Primary Examiner* — Madeline Gonzalez
(74) *Attorney, Agent, or Firm* — Jeffrey D. Frantz

(57) ABSTRACT

A filter extractor may include a first gutter fixed to a tool body and a second gutter being pivotably connected to the tool body. Additionally, a lifting device may be provided on the filter extractor. The lifting device is configured to extend and retract a line through the first gutter and the second gutter to extract a filter from a fluid conduit.

16 Claims, 8 Drawing Sheets

FILTER EXTRACTOR TOOL AND METHODS THEREOF

CROSS-REFERENCE TO RELATED APPLICATIONS

This application claims priority to U.S. Provisional Patent Application No. 62/751,252 filed Oct. 26, 2018, which is herein incorporated by reference.

BACKGROUND

Field

Embodiments described herein generally relate to flow skids used in the oil & gas industry. Specifically, embodiments described herein relate to removal of screens or filters from such flow skids.

Description of the Related Art

Modular flow skids may be useful in the process of extracting and managing wells that are drilled into the earth to retrieve one or more subterranean natural resources, including oil and gas. Such skids may be utilized both offshore and onshore. For example, modular flow skids may be used for surface well testing to assess the reservoir potential, validate well performance during cleanup and commissioning, and to allow for reservoir monitoring for better field management. A modular flow skid is a structure having a set of pipes and components (i.e., fluid conduits) through which fluid (e.g., oil, gas, water, frac fluid, and testing fluids) may flow. In addition, the flow skid may include a number of flow control devices, including chokes, valves, and plugs, and may also include a number of instruments or devices for measuring and obtaining pertinent data about the fluid flowing through the one or more pipes located in the flow control modules. Further, the modular flow skid may include screens or filters inserted within the fluid conduits of the modular flow skid. Screens or filters are used to clean, filter, and remove debris from the fluid flowing through the fluid conduits.

During operations, the screens or filters are used to filter, clean, and remove debris from the fluid flowing through the fluid conduits. Subsequently, the screens or filters need to be cleaned, emptied, repaired and/or replaced from time to time. As illustrated in FIGS. 1A and 1B, in conventional methods, screens or filters 1 are extracted from a flow conduit 2 of a modular flow skid 3 using a manual hook 4 operated by a user 5 combined with an overhead crane 6 or fork lift to support the weight of the screens or filters 1.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein provide a filter extractor that includes a first gutter fixed to a tool body; a second gutter being pivotably connected to the tool body; and a lifting device, wherein the lifting device is configured to extend and retract a line through the first gutter and the second gutter.

In another aspect, the embodiments disclosed herein provide a method for extracting one or more filters from a fluid conduit by extracting the filter from the fluid conduit into a first gutter of a filter extractor; further extracting the filter from the first gutter into a second gutter of the filter extractor; and rotating the second gutter to collect debris from the filter in a bottom of the filter extractor.

In another aspect, the embodiments disclosed herein provide a system that has a modular skid having a fluid conduit, wherein the fluid conduit has a fluid inlet and a fluid outlet; at least one filter in fluid communication with the fluid conduit, wherein the filter is configured to filter a fluid flowing through the fluid conduit; and at least one filter extractor removably attached to the modular skid, wherein the filter extractor has a first gutter fixed to a tool body, a second gutter being pivotably connected to the tool body, and a lifting device attached to the tool body, wherein the lifting device is configured to extend and retract a line through the first gutter and the second gutter, wherein the second gutter has a first position and a second position, wherein the second gutter is aligned with the first gutter in the first position, and the second gutter is aligned with an open end of the tool body in the second position, and wherein the filter extractor is configured to extract the filter from the fluid conduit by attaching an end of the line to the filter.

Other aspects and advantages will be apparent from the following description and the appended claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
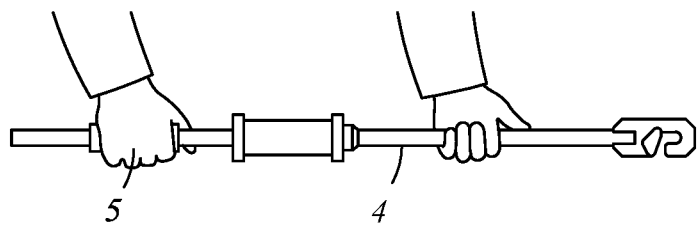
FIGS. 1A and 1B are perspective views of a prior art filter extractor system.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a drilling rig site in reference to a drilling rig, but any terms designating rig type (i.e., any land rig or offshore rig) should not be deemed to limit the scope of the disclosure, since the apparatus and methods described herein are generally applicable to facilities that use filters. It is to be further understood that the various embodiments described herein may be used in various stages of a well, such as rig site preparation, drilling, completion, abandonment etc., and in other environments, such as work-over rigs, fracking installation, well-testing installation, oil and gas production installation, without departing from the scope of the present disclosure. The embodiments are described merely as examples of useful applications, which are not limited to any specific details of the embodiments herein.

In one aspect, embodiments disclosed herein relate to a filter extractor tool. A filter extractor tool may also be interchangeably referred to as a screen extractor tool in the present disclosure. Similarly, a filter may be interchangeably referred to as a screen in the present disclosure. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Figure 1B:
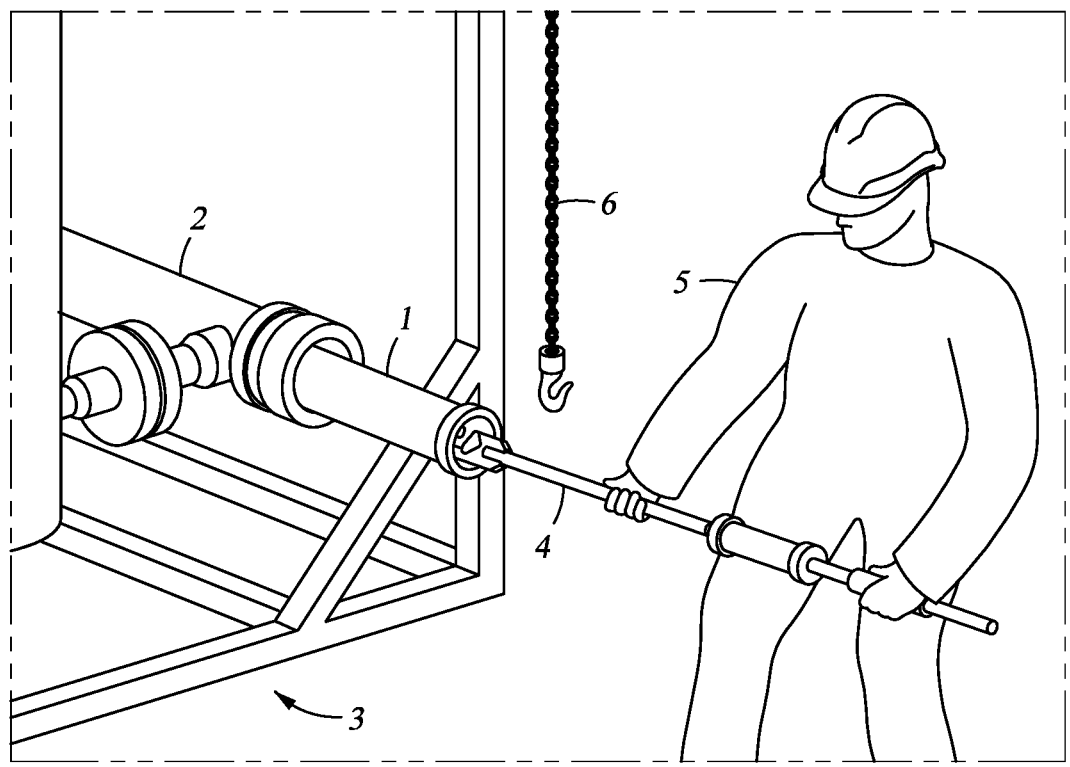

Filter extractor tools, according to embodiments herein, are apparatuses that include a line, such as a chain block, for extracting a filter from a fluid conduit and multiple gutters, which may be fixed or movable, for draining/cleaning the filter. In addition, the filter extractor tools may be operated mechanically, hydraulically, or pneumatically. The elimination of manual, i.e. handheld, hooks and the use of an overhead crane significantly reduce HSE risks, potentially equipment damage, and unwanted downtime. As described in FIGS. 1A and 1B, conventional methods of extracting the filter 1 from the flow conduit 2 of the flow modular skid 3 in the oil and gas industry are typically the manual hook 4 handled by the user 5. Further, the overhead crane 6 is needed to complete the extraction of the filter 1. Such conventional methods may be both time consuming and may also increase HSE risks. For example, in order to extract the filter 1, the user 5 must manually attach the hook 4 to the filter 1 in the flow conduit 2 and proceed to pull the hook 4 until enough of the filter 1 is free from the flow conduit 2 such that the user 5 may use the overhead crane 6 to support the filter 1. This additional manual hands-on method by the user 5 adds to increasing the likelihood of HSE risk, spillage of fluids onto the rig floor, damage to equipment, and cause unwanted downtown. Accordingly, one or more embodiments in the present disclosure may be used to overcome such challenges as well as provide additional advantages over conventional methods of filter extraction in oil and gas operations, as will be apparent to one of ordinary skill in the art upon reading this disclosure.

Figure 2A:
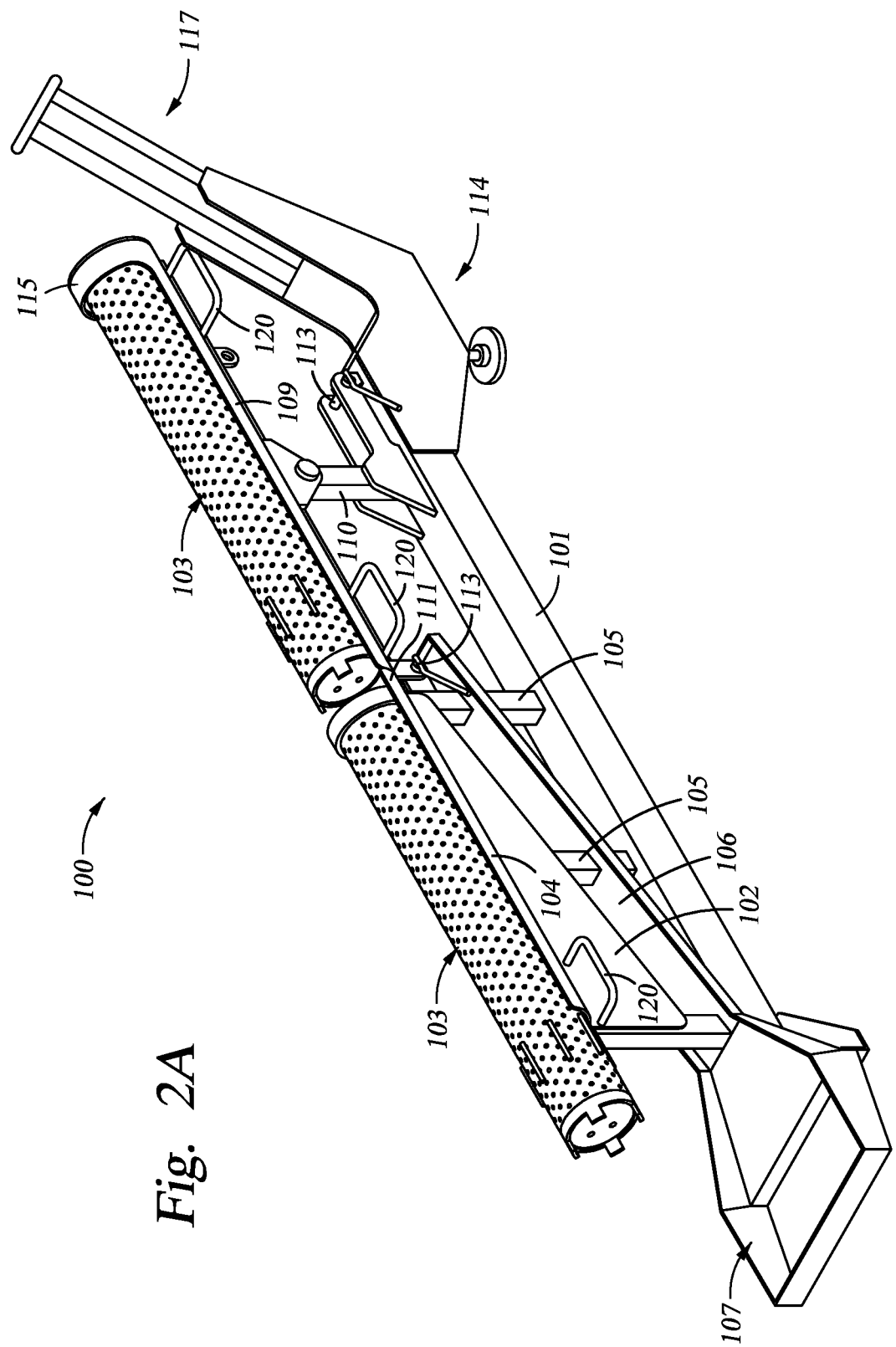
FIGS. 2A and 2B are perspective views of a filter extractor tool in accordance with one or more embodiments of the present disclosure.
Figure 2B:
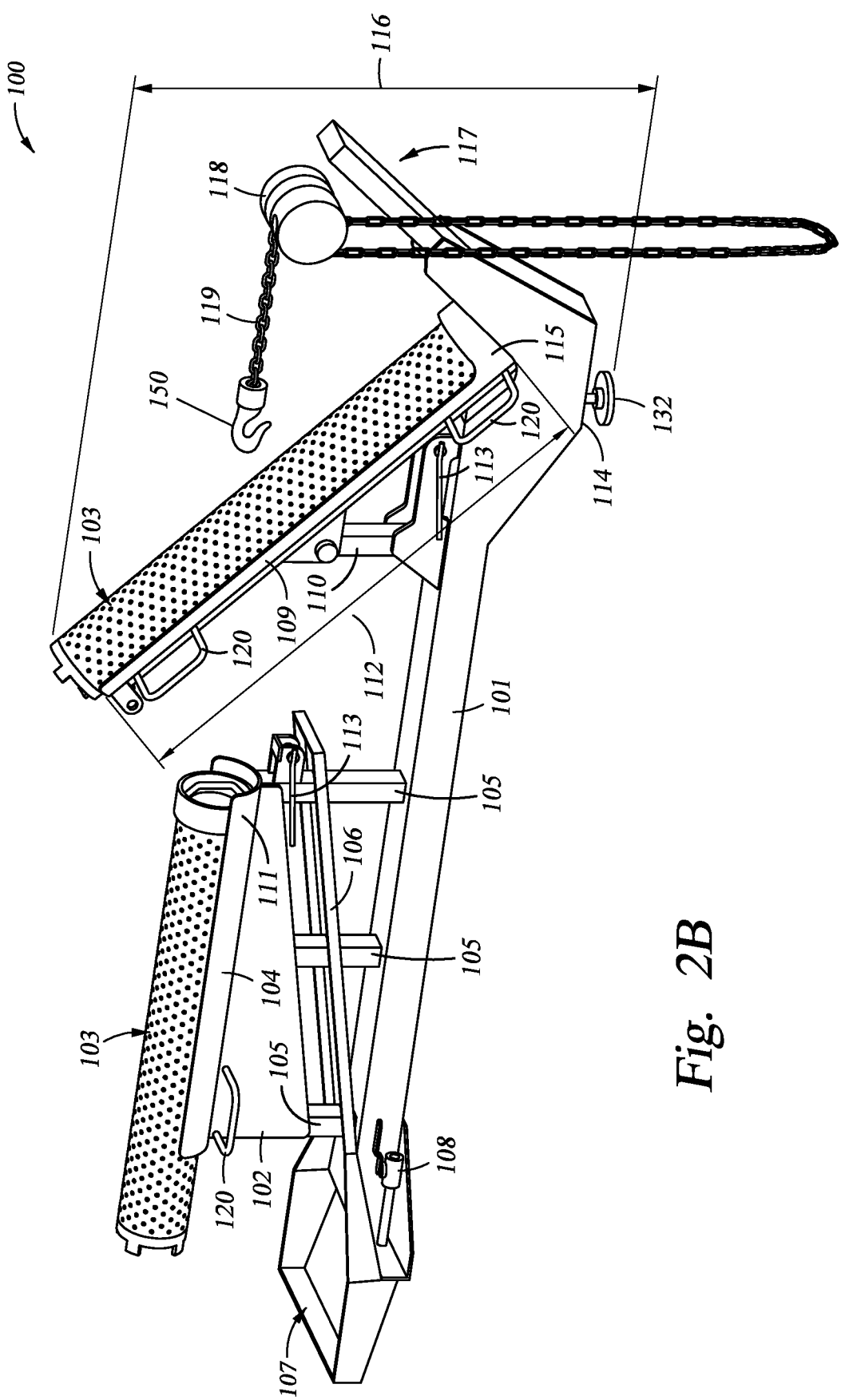

Turning to FIGS. 2A and 2B, FIGS. 2A and 2B show a perspective view of a filter extractor tool 100 in accordance with one or more embodiments of the present disclosure. The filter extractor tool 100 includes a tool body 101 having a length that may be at least twice the length of a filter 103 supported thereon. As known in the art, a filter, such as the filter 103, may be a structure used to filter, clean, and remove debris from fluids flowing through fluid conduits. As used herein, fluids may refer to liquids, gases, and/or mixtures thereof. It is noted that the filter 103 in one or more embodiments may be configured as a perforated metal tube or any shape required to fit the filter 103 in a fluid conduit.

The filter extractor tool 100 includes a first gutter 104 fixed to tool body 101, for example via support frame 102. As illustrated, support frame 102 includes a plurality of support legs 105 extending to tool body 101. While three support legs 105 are shown, it may be understood that any configuration of a support frame 102 and/or any number of support legs 105 may be used to have the first gutter 104 securely positioned. It is further envisioned that the first gutter 104 may have a cross-sectional shape of a semi-circle or arc (circular or non-circular) or any cross-sectional shape suitable to hold the filter 103. The first gutter 104 may facilitate spillage collection for the filter such that the first gutter 104 may be perforated or contain slots (not shown) so fluids or debris may drip from filter 103 through the first gutter 104 onto a drip tray 106 disposed below the first gutter 104. As illustrated in FIGS. 2A and 2B, the drip tray 106 may be inclined at any angle such the fluids or debris dripping from the first gutter 104 flow into a trough 107 of the drip tray 106. Further, as illustrated, the first gutter 104 has a length less than the filter 103 such that a distal end of the filter 103 is not supported by the gutter 104, thereby allowing fluid to drip directly into trough 107. A drain valve 108 (see FIG. 2B) is attached to the trough 107 of the drip tray 106. The drain valve 108 may be automatically or selectively closed or opened such the fluids and debris from the drip tray 106 can be drained. It is further envisioned that a hose (not shown) may be connected to the drain valve 108 in order to transport the fluids and debris from the drip tray 106 and trough 107.

Still referring to FIGS. 2A and 2B, the filter extractor tool 100 includes a second gutter 109 pivotably attached to a vertical support 110 of the tool body 101 so that the second gutter 109 can be rotated relative to the vertical support 110. Similar to the first gutter 104, it is further envisioned that the second gutter 109 may have a cross-sectional shape of a semi-circle or arc (circular or non-circular) or any cross-sectional shape suitable to hold the filter 103. The second gutter may have a length 112 such that the filter 103 completely fits on the second gutter 109. Additionally, the second gutter 109 rotates about the pivot from a first position to a second position. FIG. 2A shows the second gutter 109 in the first position, i.e. horizontal, and FIG. 2B shows the second gutter 109 in the second position, i.e. tilted. Pins 113 may be used to lock the second gutter 109 in either the first or second position. The pins 113 will be further described in FIGS. 3A-3C and 4. In the first position (see FIG. 2A), the second gutter 109 is aligned with a proximal end 111 of the first gutter 104 such that the filter 103 may travel from the first gutter 104 to the second gutter 109.

In the second position (see FIG. 2B), the second gutter 109 is tilted to be at an angle such that the second gutter is aligned with a bottom 114 of the tool body 101 to collect any debris falling from the filter 103. The bottom 114 of the tool body 101 can be an open end such that the debris from the filter 103 directly exits the filter extractor tool 100 and/or the filter 103 may be removed from the filter extractor tool 100. It is further envisioned that a tank or hose may be connected to or placed under the bottom 114 to collect the debris from the filter 103. Further, a distal end 115 of second gutter 109 acts as a stop for the filter 103 to abut against. Additionally, the distal end 115 holds the filter 103 in place such that the filter is 103 is held onto the second gutter 109 when moving from the first to the second position or vice versa. The second gutter may be manually, mechanically, hydraulically, or pneumatically rotated. Furthermore, in the second position, the second gutter 109 extends from the bottom 114 to a height 116, which is tallest part of the filter extractor tool 100. It is further envisioned that either or both the first and second gutters 104, 109 may include handles 120 to aid in handling. In a non-limiting example, the handle 120 of the second gutter 109 may be used to move the second gutter 109 between the first and second positions.

Further illustrated by FIGS. 2A and 2B, a lifting device 118 may be coupled to a distal end 117 of the tool body 101 (adjacent to the second gutter). The lifting device 118 is any apparatus, such as a chain block, hoist, reel or a winch, that is able to extend and retract a line 119, which will be further described in FIG. 4, to move a filter 103 through the gutters 104, 109. Examples of the line 119 include a metal chain or wire rope. In addition, it is further envisioned that the lifting device 118 may be actuated manually, mechanically or automatically. The line 119 here includes an attachment 150 at an end of the line 119 that is used to couple the line 119 to the filter 103. The attachment 150 may be a hook, magnet, or any mechanical fastener used to attach the line 119 to the filter 103. In a non-limiting example, a hook attachment (see reference numeral 125 in FIG. 3A) may be coupled to an end of the filter 103 and the end of the line 119 may be attached to the hook attachment. It is further envisioned that while FIGS. 2A and 2B show two gutters and one lifting device, the present disclosure is not limited to such a configuration and may include any numbers of gutters and lifting devices without departing from present scope of the disclosure. For example, in a non-limiting example, the filter extractor tool 100 may have one gutter that allows for both draining the filter 103 into the drip tray 106 and tilting the gutter to empty the filter 103 into the bottom 114.

Figure 3A:
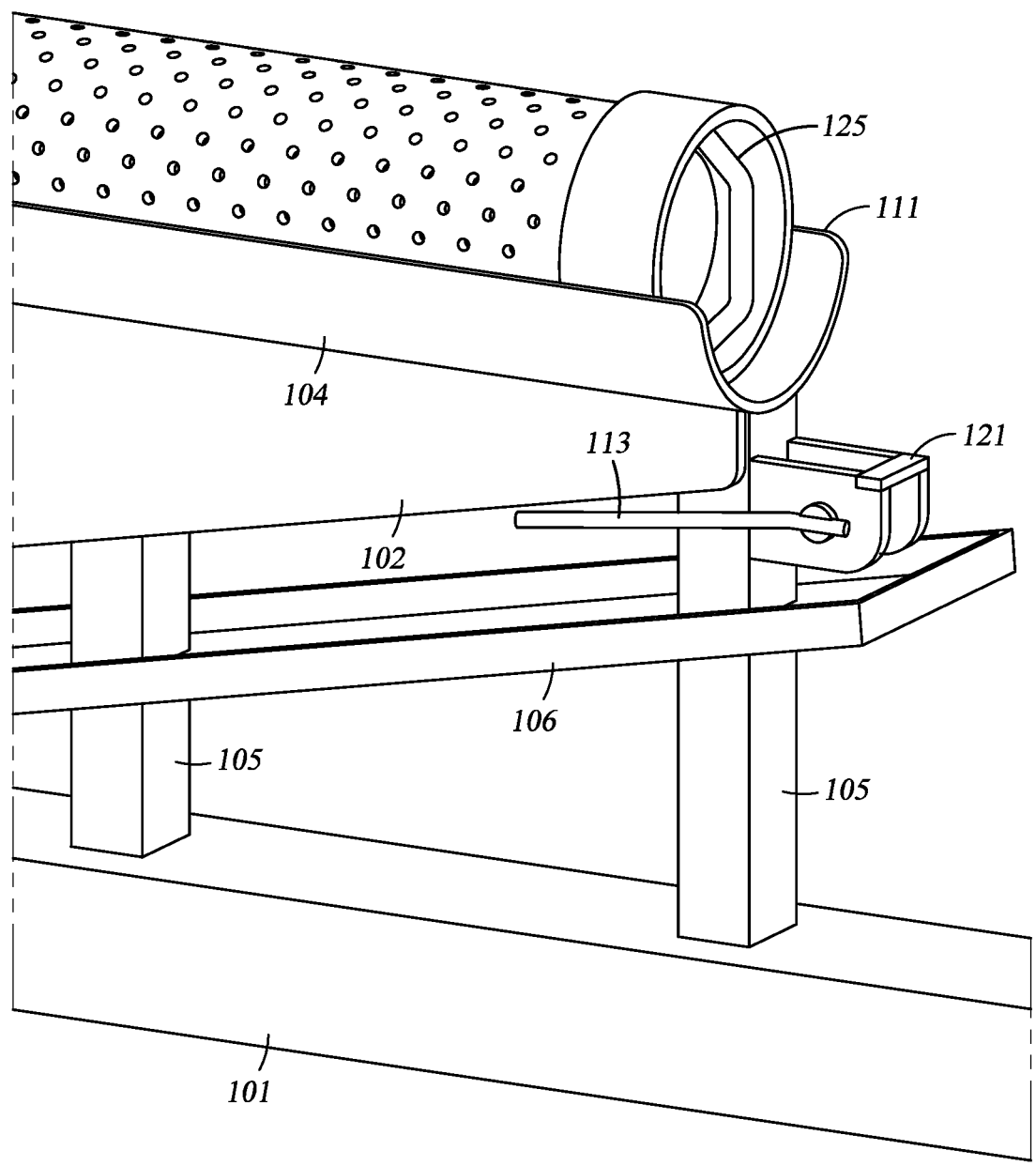
FIGS. 3A-3C are perspective views of portions of the filter extractor tool of FIGS. 2A and 2B in accordance with one or more embodiments of the present disclosure.
Figure 3B:
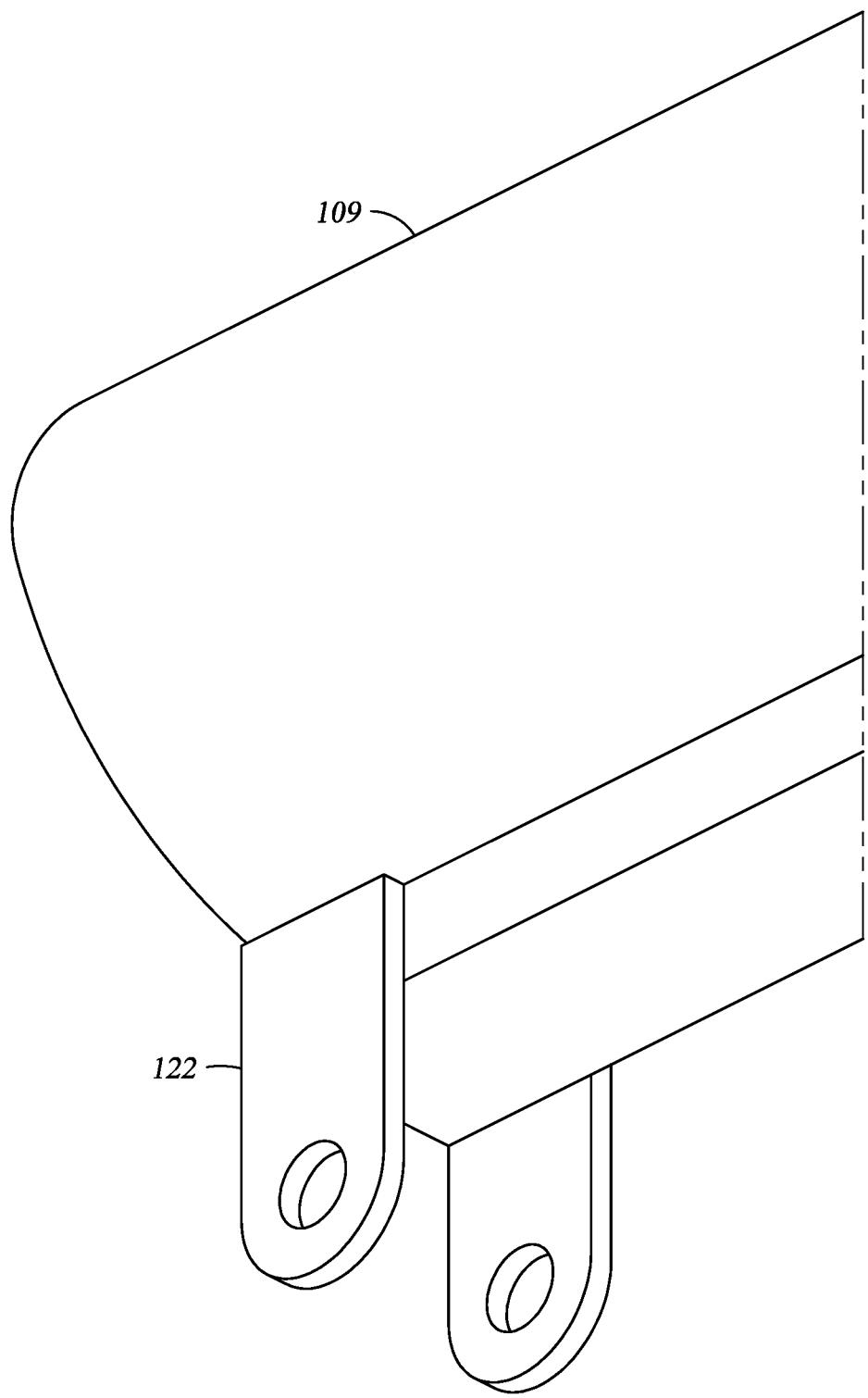
Figure 3C:
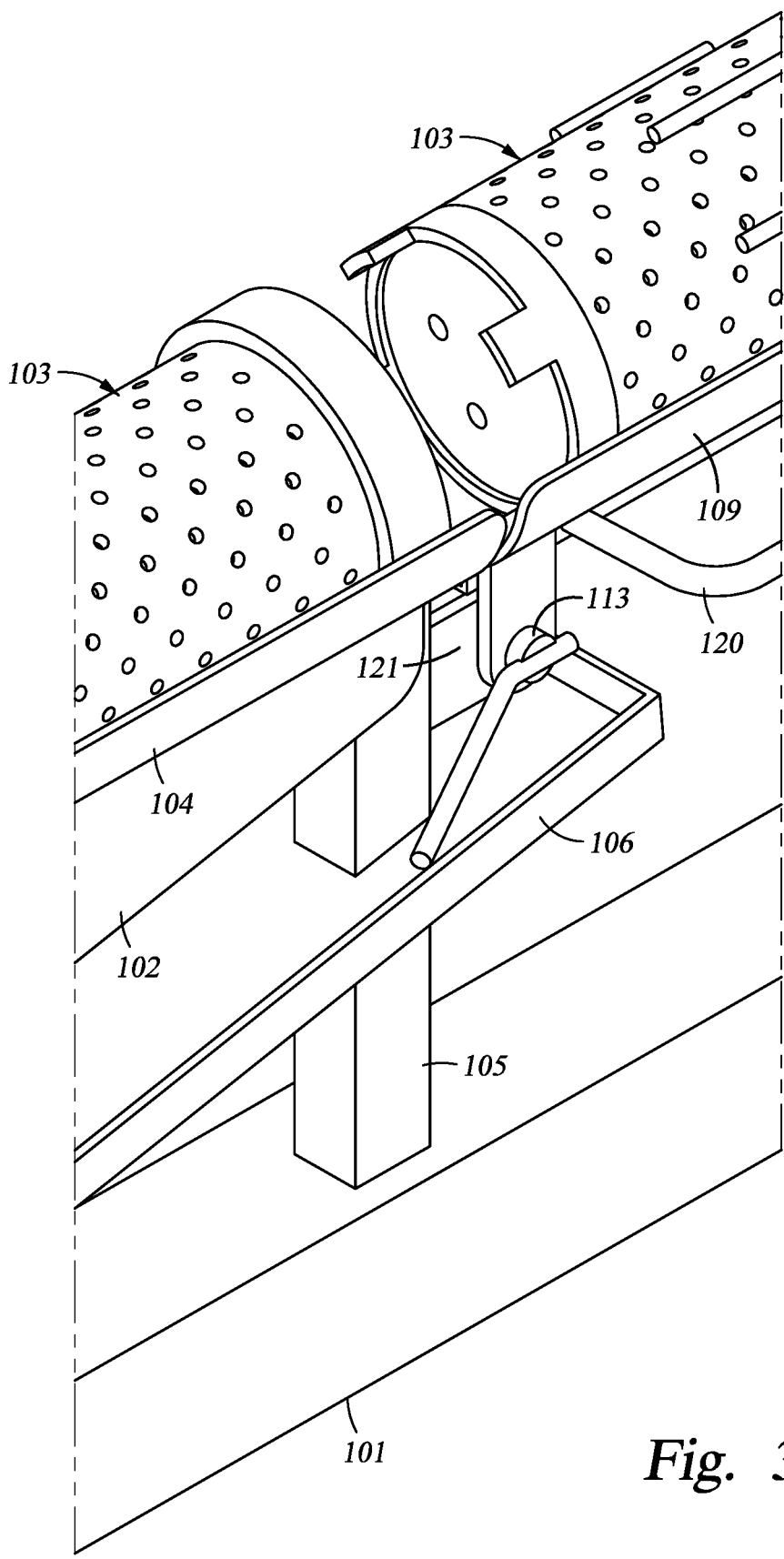

Referring FIGS. 3A-3C, in one or more embodiments, the pin 113, which may be used to lock the second gutter 109 in the first position, is located at the proximal end 111 of the first gutter 104. As further illustrated by FIGS. 3A-3C, a first set of brackets 121, with holes, extend from one of the support legs 105. Additionally, a second set of brackets 122 (FIG. 3B), with holes, extend from the second gutter 109. In order to lock the second gutter 109 in the first position, the holes of the second set of brackets 122 are aligned with the holes of first set of brackets 121 and then the pin 113 is inserted through both sets of brackets 121, 122 via the holes to lock the second gutter 109 in the first position (FIG. 3C).

Figure 4:
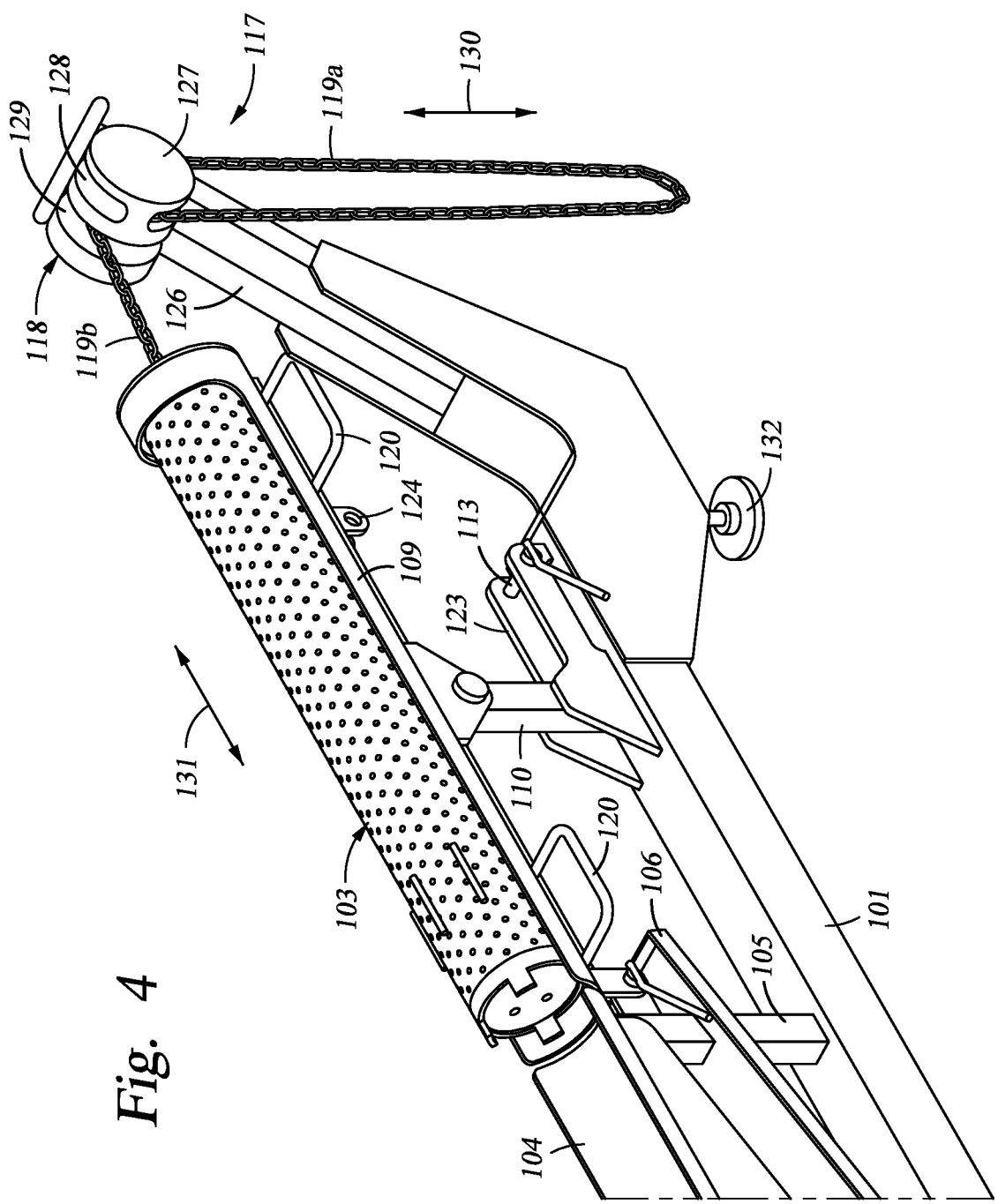
FIG. 4 is a perspective view of a lifting device of the filter extractor tool of FIGS. 2A and 2B in accordance with one or more embodiments of the present disclosure.

It is further envisioned that the same pin/bracket configuration, as illustrated in FIGS. 3A-3C, may be used to lock to the second gutter 109 in the second position. As shown by FIG. 4, in one or more embodiments, a third set of brackets 123 with holes, may extend from a lower end of vertical support 110 or body 101 such that when the second gutter 109 is in the second position, a fourth set of brackets 124, with holes, extending from the second gutter 109 align with the third set of brackets 123. With the holes of the brackets 123, 124 aligned, the pin 113 may be inserted within said holes to lock the second gutter 109 in the second position.

Still referring to FIG. 4, in one or more embodiments, the lifting device 118 is illustrated to be connected to a rigid arm 126 at the distal end 117 of the tool body 101. Here, the lifting device 118 is a chain block that includes a housing 127 (i.e., a drum or lift-wheel) for a first line 119a and a second line 119b (i.e. a chain). The housing 127 has a first plurality of slots 128 for the first line 119a to move in a vertical direction (as indicated by arrow 130) in and out of the housing 127. The housing 127 includes a second plurality of slots 129 for the second line 119b to move in a horizontal direction (as indicated by arrow 131) in and out of the housing 127. In this embodiment, the first line 119a is moved in the vertical direction (see arrow 130) such that the chain 119 engages a wheel (not shown) within the housing 127 to move the second chain 119b in the horizontal direction (see arrow 131). It is further envisioned lifting device 118 may be operated manually or automatically.

Figure 5:
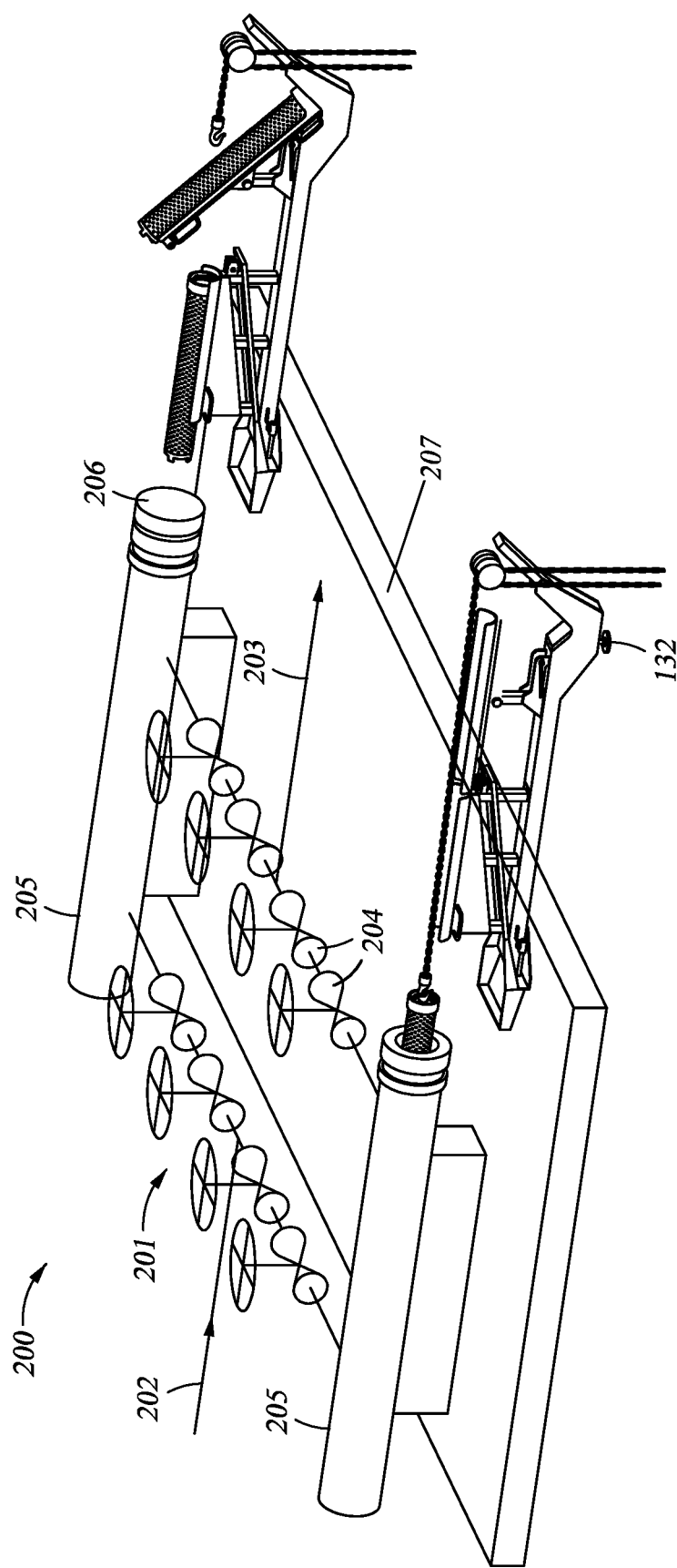
FIG. 5 is a perspective view of a modular skid with the filter extractor tool of FIGS. 2A and 2B in accordance with one or more embodiments of the present disclosure.

As shown in FIG. 5, the filter extractor tool 100 (as described in FIGS. 2A-4) can be attached to a modular skid 200. The modular skid 200 may be any type of modular skid used for fluid flows through a fluid conduit 201 with a fluid inlet 202 and a fluid outlet 203. In a non-limiting example, the modular skid 200 may be a plug and trash catcher skid. The plug and trash catcher skid may be used to help prevent plugging of chokes (on the skid) and/or other surface process equipment during drilling, well testing or fracturing frac flow back operations. Specifically, the plug and trash catcher skid has the capability of continuous debris removal without shutting down flow back or drilling operations. Further, the trash catcher (debris catcher) is designed to catch and retain chunks from drilled plugs, for example. Said trash catchers are very effective to prevent erosion damage to downstream equipment and catch and retain debris, chunks and trash, drilled bridge plugs etc. Advantageously, the plug and trash catcher skid aids in: removal and cleanup on horizontal-multilateral completion and work-over; drill out of completion tools such as bridge plugs, selective frac packer system; capture of frac sand and formation solids; and work over use to capture drill out solids, such as cement retainer, bride plug, cement and formation solids frac sand, and fishing operation solids.

The modular skid 200 may include isolation valves 204 in-between pots 205. Each pot 205 holds a filter like the filter 103 in FIGS. 2A and 2B. The isolation valves 204 can be used to direct fluid from the fluid conduit 201 to the pots where the filters are in fluid communication with the fluid conduit 201. The isolations valves can be operated to allow for fluid flow to only go through one pot at a time, both pots, or none of the pots. Further, each pot 205 includes a plug 206 to form a pot plug (205, 206) to enclose the filter. While two pots are shown in FIG. 5, one skilled in the art will appreciate how the modular skid 200 may have little as one pot or any number of pots required for operations. As further shown by FIG. 5, the filter extractor tool 100 is coupled to a base 207 of the modular skid 200 to align the filter extractor tool 100 with the pot plug (205, 206). One skilled in the art will appreciate how the filter extractor tool 100 is coupled to the base 207 to be removable or fixed via mechanical fasteners, welding, adhesives, or any known way in the art. Additionally, the filter extractor tool 100 may have a support level 132 (see, also, FIG. 4) attached to a base of tool body (101) to level the filter extractor tool 100 at a desired height. It is further envisioned that while FIG. 5 illustrates the filter extractor tool 100 coupled to the base 207, the filter extractor tool 100 may be coupled to any part of the modular skid 200. In some embodiments, the filter extractor tool 100 may remain unattached to the modular skid 200 and be disposed on a surface near the pot plug (205, 206). In one example, the filter extractor tool 100 has wheels such that the filter extractor tool 100 can be aligned with the pot plug (205, 206) and then the wheels can be locked such the filter extractor tool 100 does not move. Once the filter extractor tool 100 is aligned with the pot 205, the plug 206 may be removed such that the filter extractor tool 100 is used to remove and clean the filter within the pot 205. The line of the lifting tool is extended to engage with the filter, and the lifting tool is operated to extract the filter onto the first gutter, and then onto the second gutter. Liquid can be allowed to drain from the filter, and then the second gutter is tilted to empty the filter of any remaining debris before the filter is removed from the filter extractor tool 100. Additionally, while the filter is being cleaned, a spare filter may be inserted into the pot 205 to ensure operations continue without delay.

Furthermore, methods of the present disclosure may include use of the filter extractor tool and other structures, such as in FIGS. 2A-5. Because the method may apply to any of the embodiments, reference numbers are not referenced to avoid confusion of the numbering between the different embodiments.

Initially, a filter extractor tool is coupled or bolted onto a base of a modular skid to align with a fluid conduit of the modular skid. Then a plug at an end of the fluid conduit is removed so that a line or chain of the filter extractor tool is attached to the filter within the fluid conduit. In addition, the line or chain is extended from a reel disposed on or near the filter extractor tool. Then, the filter is extracted from the fluid conduit into a first gutter of the filter extractor tool by retracting the chain or line. Once the filter is positioned on the first gutter, fluids and debris are allowed to drip from the filter onto the first gutter and through perforation or slots of the first gutter to drip into a drip tray disposed below the first gutter. Further, the drip tray may be drained by selectively or automatically opening a drain valve. For example, a sensor may be in the drip tray to detect a fill level to either sound an alarm or automatically open the drain valve to drain the drip tray.

Next, a second gutter is locked into a first position such that the second gutter is aligned with the first gutter. The filter is then further extracted from the first gutter into the second gutter of the filter extractor tool by further retracting the line. Once the filter is abutted against a distal end of the second gutter, the second gutter is unlocked from the first position and rotated (manually or automatically) about the pivot point to be in a second tilted position and the second gutter is then locked in the second position. With the second gutter locked in the second position, the filter is emptied such that debris from the filter is collected in a bottom of the filter extractor. Further, the bottom may be opened so that the debris may be evacuated from the filter extractor tool. It is further envisioned that while the filter is being cleaned on the filter extractor tool, a spare filter can be inserted into the fluid conduit to avoid delays. Once the filter is cleaned, the filter may replace the spare filter or be placed in storage for use at a different time.

While the foregoing is directed to embodiments of the present invention, other and further embodiments of the present disclosure may be devised without departing from the basic scope thereof, and the scope thereof is determined by the claims that follow.

What is claimed is:

1. A filter extractor, comprising:
   a tool body;
   a first gutter in the form of a first trough that is fixed to the tool body, wherein the first gutter is configured to support a first filter member;
   a second gutter in the form of a second trough, wherein a bottom surface of the second trough is pivotably connected to a vertical support that is connected to the tool body, wherein the second gutter is configured to support a second filter member; and
   a lifting device coupled to the tool body, wherein the lifting device is configured to extend and retract a line through the first gutter and the second gutter to extract at least one of the first filter member and the second filter member from a fluid conduit.

2. The filter extractor of claim 1, further comprising a drip tray disposed at an incline below the first gutter.

3. The filter extractor of claim 2, further comprising a drain valve coupled to the drip tray.

4. The filter extractor of claim 1, wherein the second gutter has a first position and a second position, wherein the second gutter is aligned with the first gutter in the first position, and wherein the second gutter is aligned with an open end of the tool body in the second position.

5. The filter extractor of claim 4, further comprising at least one locking pin to lock the second gutter in the first position or the second position.

6. The filter extractor of claim 4, wherein the second gutter is connectable to a proximal end of the first gutter in the first position.

7. The filter extractor of claim 6, wherein the lifting device is at a distal end of the second gutter when the second gutter is in the first position.

8. The filter extractor of claim 1, wherein the first gutter is perforated.

9. The filter extractor of claim 1, further comprising a hook at an end of the line.

10. The filter extractor of claim 1, wherein the second gutter is mechanically, hydraulically, or pneumatically rotated.

11. The filter extractor of claim 1, wherein the first trough and the second trough each comprise a cross-sectional shape of a semi-circle or an arc.

12. The filter extractor of claim 1, wherein the second gutter is pivotable relative to the tool body while the first gutter remains stationary relative to the tool body.

13. The filter extractor of claim 1, wherein the first gutter is fixed to the tool body by a support frame comprising a plurality of support legs.

14. The filter extractor of claim 1, wherein the lifting device comprises a housing configured to support the line, wherein the line is extended and retracted from the housing.

15. The filter extractor of claim 1, wherein the line is movable along at least a longitudinal axis of the first gutter.

16. The filter extractor of claim 1, further comprising a support level coupled to a base of the tool body to level a height of the filter extractor.

* * * * *